US012711981B2

(12) United States Patent
Hosinski et al.

(10) Patent No.: US 12,711,981 B2
(45) Date of Patent: Aug. 18, 2026

(54) ACOUSTIC DETECTION OF GLASS BREAKAGE EVENTS

(71) Applicant: AMGEN INC., Thousand Oaks, CA (US)

(72) Inventors: Grant Hosinski, Thousand Oaks, CA (US); Tyler Bellenfant, Thousand Oaks, CA (US); Thomas Clark Pearson, Newbury Park, CA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

(21) Appl. No.: 18/846,798

(22) PCT Filed: Apr. 25, 2023

(86) PCT No.: PCT/US2023/019691
§ 371 (c)(1),
(2) Date: Sep. 13, 2024

(87) PCT Pub. No.: WO2023/211865
PCT Pub. Date: Nov. 2, 2023

(65) Prior Publication Data

US 2025/0104729 A1 Mar. 27, 2025

Related U.S. Application Data

(60) Provisional application No. 63/409,498, filed on Sep. 23, 2022, provisional application No. 63/336,847, filed on Apr. 29, 2022.

(51) Int. Cl.
*G10L 25/51* (2013.01)
*G05B 23/02* (2006.01)
(Continued)

(52) U.S. Cl.
CPC .......... *G10L 25/51* (2013.01); *G05B 23/0208* (2013.01); *G06N 3/0464* (2023.01); *G06N 3/09* (2023.01)

(58) Field of Classification Search
CPC .. G10L 25/51; G05B 23/0208; G06N 3/0464; G06N 3/09
See application file for complete search history.

(56) References Cited

U.S. PATENT DOCUMENTS

2018/0233125 A1* 8/2018 Mitchell ................ G10L 25/78
2019/0043525 A1* 2/2019 Huang .................... G10L 25/21
(Continued)

FOREIGN PATENT DOCUMENTS

CN 212833452 U * 3/2021
CN 114171015 A 3/2022

OTHER PUBLICATIONS

International Search Report for Application No. PCT/US2023/019691 mailed Jul. 5, 2023.
(Continued)

*Primary Examiner* — Rufus C Point
(74) *Attorney, Agent, or Firm* — MARSHALL, GERSTEIN & BORUN LLP

(57) ABSTRACT

Systems and methods of using machine learning for identifying glass breakage events can include (a) accessing or obtaining the machine learning mode, (b) obtaining audio data, (c) determining, by processing the audio data using the machine learning mode, whether a glass breakage event has occurred, and (d) when determined that the glass breakage event has occurred, indicating the glass breakage event has occurred. Methods and instructions for training a machine learning model for identifying a glass breakage event can include (a) obtaining training audio data, (b) classifying the training audio data into a plurality of subsets, and (c)
(Continued)

generating the machine learning model for identifying glass breakage events using the classified subsets.

18 Claims, 7 Drawing Sheets

(51) Int. Cl.
*G06N 3/0464* (2023.01)
*G06N 3/09* (2023.01)

(56) References Cited

U.S. PATENT DOCUMENTS

2019/0259378 A1* 8/2019 Khadloya ............... G06F 9/542
2023/0060936 A1* 3/2023 Thiruvenkatanathan .................... G10L 25/21

OTHER PUBLICATIONS

Written Opinion for Application No. PCT/US2023/019691 mailed Jul. 5, 2023.
Bayram et al., "Real time detection of acoustic anomalies in industrial processes using sequential autoencoders", Expert Systems., vol. 38, No. 1, Apr. 21, 2020.
Lojka et al., "Efficient acoustic detector of gunshots and glass breaking", Multimedia Tools and Applications, Kluwer Academic Publishers, Boston, US, vol. 75, No. 17, Sep. 11, 2015 (Sep. 11, 2015), pp. 10441-10469.
Singapore Patent Application No. 11202407465V, Search Report and Written Opinion, dated Jul. 30, 2026.

* cited by examiner

ACOUSTIC DETECTION OF GLASS BREAKAGE EVENTS

CROSS-REFERENCE TO RELATED APPLICATIONS

This is the United States national phase of International Patent Application No. PCT/US2023/019691, filed Apr. 25, 2023, which claims priority to U.S. Patent Application No. 63/409,498, filed on Sep. 23, 2022, and U.S. Patent Application No. 63/336,847, filed on Apr. 29, 2022, each of which are hereby incorporated herein by reference in their entirety.

FIELD OF THE DISCLOSURE

The present application relates generally to the use of predictive models to identify glass breakage events. More specifically, the present application may relate to the identification of glass breakage events in a biomanufacturing process using audio data.

BACKGROUND

Many manufacturing processes operate upon, or otherwise make use of, glass. For example, glass may be included in components of machinery or equipment used in the manufacturing process, used to contain or package a product produced by the manufacturing process, included in the product itself, etc. Biomanufacturing processes are one type of manufacturing process that routinely involve glass. In biomanufacturing processes, a fill finish process is concerned with preparing biological product (e.g., drug product) in its delivery container. In many biologic products, the delivery container is a glass vial. Other biomanufacturing processes/biological products that include glass are pre-filled glass syringes, auto-injectors, or intravenous (IV) bags. Glass is an exemplary material for use in biomanufacturing processes because of its chemical durability, hermeticity, strength, cleanliness, and transparency. However, glass containers are not without risk. Issues with glass containers include breakage, delamination, and glass particles or fragments, all of which can affect the safety and efficacy of biological products. In fact, product recalls in the past decade due to glass issues, including contamination from delaminating (flaking) glass vials, breakage, and particulates, have resulted in hundreds of millions of units of biological products packaged in vials, syringes, or glass auto-injectors being withdrawn from markets. Conventionally, glass breakage events that are detected during manufacturing trigger an immediate and pre-defined process for halting operations, documenting, and subsequently investigating the root cause of the glass breakage event, which can often take multiple days. Accordingly, glass breakage events are costly, not only in the form of lost labor hours during the downtime, but also in the form of scrap costs, as all drug product produced during the run must typically be thrown out, which can cost tens of thousands of dollars alone. Finally, glass breakage introduces human safety considerations for operators as glass shards pose cutting hazards during cleanup.

While the risks and costs of glass breakage events in manufacturing processes (e.g., biomanufacturing process) remain significant, the advancement of manufacturing processes, through automation, robotics, and single use technologies, as well as continued growth, have resulted in production rates that are too high to be feasibly monitored or examined from start to finish by humans alone. Without human monitoring, certain events, such as glass breakage events may go undetected. Many of the previously-discussed negative impacts of a glass breakage event are only exacerbated should the glass breakage event go undetected for longer periods of time. Moreover, even in manufacturing processes with low enough production rates such that a human may monitor the process, glass breakage events can be difficult to detect by human vision, sometimes only producing small particulates or micro-fractures.

Accordingly, with conventional manufacturing processes (e.g., biomanufacturing process), there is an increased likelihood that glass breakage events will go undetected for longer periods of time and accordingly will introduce significant risks and costs.

BRIEF SUMMARY

Aspects of the present disclosure provide a method for using machine learning for identifying glass breakage event including: (a) accessing or obtaining a machine learning model trained using training audio data that represent (i) training ambient sounds, (ii) training glass sounds, and (iii) training glass breakage sounds; (b) obtaining, by the one or more processors, audio data over a period of interest; (c) determining, by processing the audio data using the machine learning model, whether a glass breakage event has occurred during the period of interest; and (d) when determined that the glass breakage event has occurred, indicating, by the one or more processors, that the glass breakage event has occurred.

In some aspects, the training audio data and the audio data each include one or more spectrograms; and obtaining the audio data over the period of interest includes generating the spectrogram of the audio data from raw audio data using a Fourier Transform.

In some aspects, (i) the training ambient sounds include sounds caused by operation of machinery, (ii) the training glass sounds include sounds caused by a first glass surface contacting either a second glass surface or a non-glass surface, and (iii) the training glass breakage sounds include sounds caused by either glass cracking or glass breaking. In some aspects, the machinery implements a biomanufacturing process and the training glass sounds and the training glass breakage sounds are produced by one or more containers of one or more drug products.

In some aspects, the method further includes, after identifying the glass breakage event, automatically causing, by the one or more processors, the machinery to stop operation.

In some aspects, the method further includes, iteratively adjusting, by the one or more processors, gain of amplification applied to one or both of training audio signals or audio signals until a performance threshold is satisfied, wherein the training audio signals and the audio signals respectively correspond to the training audio data and the audio data.

In some aspects, the machine learning model is a convolutional neural network.

Another aspect of the present disclosure provides a computer system including, (a) one or more processors; and (b) a program memory coupled to the one or more processors and storing executable instructions that, when executed by the one or more processors, cause the computer system to perform the method of any one of the previous aspects.

Further aspects of the present disclosure provide a method and executable instructions for training a machine learning model for identifying glass breakage events including: (a) obtaining training audio data, (b) classifying the training audio data into a plurality of subsets each corresponding to different actual outcome data, the subsets including (i) at least one subset representing training ambient sounds, (ii) at least one subset representing training glass sounds, and (iii) at least one subset representing training glass breakage sounds, and (c) generating the machine learning model for identifying glass breakage events using the classified subsets of the training audio data.

BRIEF DESCRIPTION OF THE DRAWINGS

The skilled artisan will understand that the figures described herein are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like primary characters throughout the various drawings generally refer to functionally similar or structurally similar components.

DETAILED DESCRIPTION

Figure 1A:
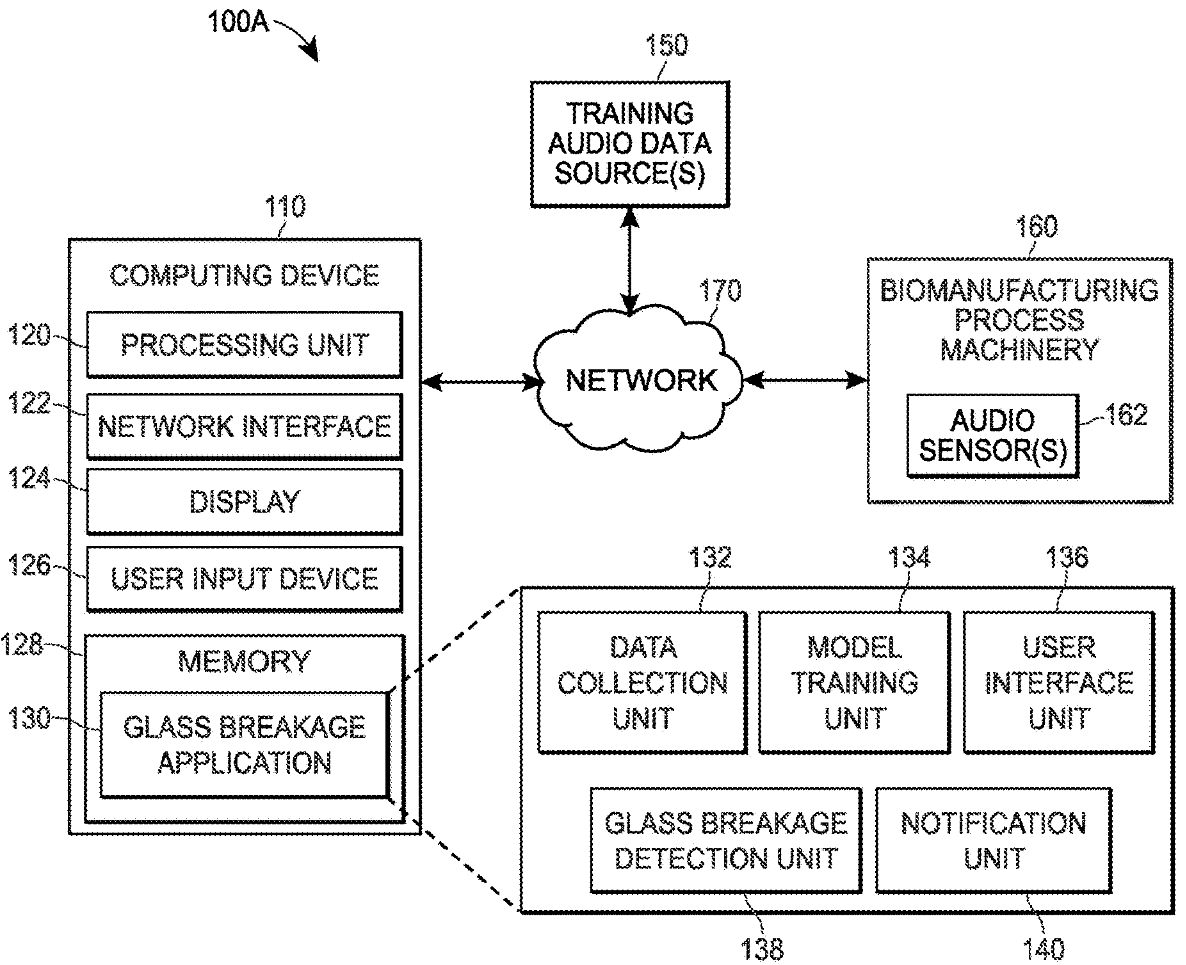
FIGS. 1A and 1B are simplified block diagrams example systems for identifying glass breakage events in biomanufacturing processes.

As the pace of biomanufacturing processes quicken, there is an increased need to be able to monitor for and detect glass breakage events as quickly as possible. The present disclosure aims to reduce problems with conventional techniques (e.g., as described in the Background section) by providing techniques using machine learning techniques to identify glass breakage events. The present techniques may train a machine learning model using training audio data that represents ambient sounds, glass sounds, and glass breakage sounds, which may be labeled accordingly in the training audio data. The present techniques may use the machine learning model to determine, over a period of interest represented in audio data, whether a glass breakage event has occurred, and, if so, notify or indicate as such. By determining, and then notifying/indicating when a glass breakage event has occurred, the present techniques aim to provide insight to an operator of the biomanufacturing process system, and reduce the negative impacts associated with glass breakage events (e.g., as described in the Background section).

Present techniques detect when glass breakage events occur to ensure the highest product quality for patients who receive biological products (e.g., drug products) manufactured by biomanufacturing processes by immediately ceasing manufacturing operations to reduce operating costs and scrap. Audio is selected as the most viable medium for detecting glass break events due to four main factors: cost, data capacity, visibility, and adaptability. Basic audio capture devices are relatively cheap compared to other potential means of detection (e.g., video, laser curtain systems, pressure sensors, accelerometers, etc.) while requiring little calibration beyond gain setting. Video detection, on the other hand, may require expensive equipment as glass breakage events occur extremely quickly, and sometimes within small areas. As glass breakage events must be constantly monitored for, minimizing the computing power needed to both operate and store the relevant data is important. Finally, as a large breadth of biomanufacturing processes can theoretically result in glass breakage, audio detection is well-suited as it is adaptable to various biomanufacturing processes because line of sight is not required (unlike video detection). This point is especially important as many processes for vial, auto-injector, and syringe fill-finishing are accomplished without external visibility to the glass components.

Advantageously, by providing improved insights regarding glass breakage events, the present techniques reduce the negative impacts associated with conventional approaches to dealing with glass breakage events. One advantage of these insights is that less resources (e.g., fewer biological products) are wasted during a glass breakage event that is more quickly detected using present techniques, and, accordingly, resource efficiency is increased and sustainability of the biomanufacturing process system is improved. By making the biomanufacturing process system more sustainable with respect to resource use, energy efficiency of the biomanufacturing process system may also be improved and the financial or economic cost of producing each biological product may be reduced. Another advantage of the improved insights is that production throughput may increase as more biological products can be produced in a given amount of time, with reset times reduced in the event of glass breakage. Resource, energy, and cost efficiency may also be improved when dealing with glass breakage events in a biomanufacturing process because the presently disclosed techniques provide insight into the usability of the biological products produced under glass breakage events (e.g., by providing insight into a likelihood that broken glass has contaminated a biological product). Furthermore, by more readily identifying glass breakage events, data (e.g., audio data, operation data, etc.) of the biomanufacturing processes before, during, and after, the glass breakage event may be analyzed to provide insight into what causes, and what results from, glass breakage events, thereby improving the technical field of glass breakage event diagnostics.

Additional advantages of the presently disclosed techniques over conventional approaches of identifying glass breakage events will be appreciated throughout this disclosure by one having ordinary skill in the art. The various concepts and techniques introduced above and discussed in greater detail below may be implemented in any of numerous ways, and the described concepts are not limited to any particular manner of implementation. Examples of implementations are provided below for illustrative purposes.

Exemplary System

FIG. 1A is a simplified block diagram of an example system 100A for identifying glass breakage events in biomanufacturing process machinery 160, which, for example, may produce a drug product. In some embodiments, the system 100A includes standalone equipment, though in other embodiments the system 100A is incorporated into other equipment. At a high level, the system 100A includes components of a computing device 110, one or more training audio data sources 150, the biomanufacturing process machinery 160, and one or more audio sensors 162. In FIG. 1A, the computing device 110, the biomanufacturing process machinery 160, and the training audio data sources 150 are communicatively coupled via a network 170, which may be or include a proprietary network, a secure public internet, a virtual private network, and/or any other type of suitable wired or wireless network(s) (e.g., dedicated access lines, satellite links, cellular data networks, combinations of these, etc.). In embodiments where the network 170 comprises the Internet, data communications may take place over the network 170 via an Internet communication protocol. In some aspects, more or fewer instances of the various components of the system 100A than are shown in FIG. 1A may be included in the system 100A (e.g., one instance of the computing device 110, ten instances of the biomanufacturing process machinery 160, ten instances of the audio sensors 162, two instances of the training audio data sources 150, etc.).

It is worth noting that while the system 100A is illustrated as including the biomanufacturing process machinery 160, one of ordinary skill in the art will understand that the present techniques and components of the system 100A may be applied to detecting glass breakage events in other processes or fields. For example, instead of the biomanufacturing process machinery 160, the present techniques and components of the system 100A may be applied to manufacturing in food/beverage, automotive, electronic, chemical, and/or other industries.

The biomanufacturing process machinery 160 may include a single biomanufacturing process machine, or multiple biomanufacturing process machines that are either co-located or remote from each other and are suitable for producing biological products, such as drug products. The biomanufacturing process machinery 160 may generally include physical devices configured for use in producing (e.g., manufacturing) biological products (e.g., drug products), such as filling devices, agitating devices, starwheels or other vessel conveyances, and so on.

The biomanufacturing process machinery 160 may, in some embodiments, be connected with the computing device 110 either via the network 170, or directly, allowing for at least some of the functionality of the biomanufacturing process machinery 160 to be controlled by the computing device 110. In some embodiments, the biomanufacturing process machinery 160 may be capable of receiving instruction directly from a user (e.g., the biomanufacturing process machinery 160 may be manually-configurable). For example, in some embodiments, the biomanufacturing process machinery 160 may receive instructions directly from a user to control operation (e.g., start or stop operation).

The audio sensors 162 may be included in the biomanufacturing process machinery 160 (e.g., integrated into the biomanufacturing process machinery 160) or may be external sensors connected to the biomanufacturing process machinery 160. The audio sensors 162 may be used to collect audio data (e.g., directly or indirectly) inside, outside, or around the biomanufacturing process machinery 160. The audio sensors 162 may provide the audio data to, for example, the computing device 110 (e.g., via the network 170). The audio data may be any suitable data type, such as nominal data, ordinal data, discrete data, or continuous data. The audio data may be in the form of a suitable data structure, which may be stored in a suitable format such as of one or more of: M4A, FLAC, MP3, MP4, WAV, WMA, AAC, JSON, XML, CSV, etc. The audio data may be collected or provided automatically, or in response to a request. For example, a user of the computing device 110 may wish to monitor for a glass breakage event in the biomanufacturing process machinery 160 over a period of time. In response, one or more of the audio sensors 162 may collect and provide the audio data to the computing device 110 over the period of time. In some aspects, the audio sensors 162 may collect audio data in response to the biomanufacturing process machinery 160 operating. For example, the audio sensors 162 may begin collecting audio data when the biomanufacturing process machinery 160 is powered on/begins operation and may continue collecting audio data until the biomanufacturing process machinery 160 is powered off/ends operation. In some embodiments, one or more of the audio sensors 162 may include databases of data/information relating to product quality or may be configured to receive data/information relating to product quality, such as via user input.

The biomanufacturing process machinery 160 may include one or more devices (not shown) used in manufacturing of biological products (e.g., drug products, as discussed in the Background Section). The biomanufacturing process machinery 160 may be configured to be controllable via manual or automated inputs. In some embodiments, the biomanufacturing process machinery 160 may be configured to receive such control inputs locally, such as via a user input device local to the biomanufacturing process machinery 160. In some embodiments, the biomanufacturing process machinery 160 is configured to receive control inputs remotely, such as from the computing device 110 (e.g., via the network 170). The control inputs may include operation instructions, such as instructing the biomanufacturing process machinery 160 to power on/begin operation. In some aspects, the biomanufacturing process machinery 160 may end operation in response to one or more of: (i) the biomanufacturing process machinery 160 completing production of biological product (e.g., a full batch of drug product is finished), (ii) a glass breakage event being detected, or (iii) receiving a manual instruction to end operation.

The training audio data sources 150 generally include training audio data that may correspond to (e.g., may have been collected during performance of) one or more biomanufacturing processes for producing one or more biological products using the biomanufacturing process machinery 160. The training audio data may represent: (i) training ambient sounds, (ii) training glass sounds, and (iii) training glass breakage sounds, and may have been collected (by computing device 110 or another device/system) using audio sensor(s) 162 or other, similar sensors. More specifically, in some aspects, (i) the training ambient sounds include sounds caused by operation of machinery (e.g., the biomanufacturing process machinery 160), (ii) the training glass sounds include sounds caused by a first glass surface (e.g., a first drug product container) contacting either a second glass surface (e.g., a second drug product container) or a non-glass surface, and/or (iii) the training glass breakage sounds include sounds caused by either glass cracking or glass breaking. Exemplary training labels may include, "Glass Crack," "Glass Break," "Glass Shatter," "Glass Contacting Metal," "Glass Contacting Plastic," "Glass Contacting Glass," "Glass Contacting Other," "Ambient Machinery," "Ambient Other," etc. In some aspects, at least a portion of the training audio data include sounds from the biomanufacturing process machinery 160. In some aspects, however, all of the training audio data is collected using different biomanufacturing process systems. The training audio data may include data from biomanufacturing processes that have scales/sizes, settings/parameters, equipment models, etc., similar to the biomanufacturing process machinery 160, or data from biomanufacturing processes that have scales/sizes, settings/parameters, equipment models, etc., different from the biomanufacturing process machinery 160. In some embodiments, the system 100A may omit the training audio data sources 150, and instead receive the training audio data locally, such as via user input at the computing device 110 (e.g., a user providing a portable memory drive with the training audio data). In some examples, the training audio data includes, training glass sounds or training glass breakage sounds without including any training ambient sounds that is combined (or mixed) with second audio data that includes ambient sounds without including any training glass sounds or training glass breakage sounds. In some aspects, the training audio data sources 150 or the computing device 110 combine (or mix) the first audio sounds and the second audio sounds.

The computing device 110 may include a single computing device, or multiple computing devices that are either co-located or remote from each other. The computing device 110 is generally configured to apply audio data over a period of interest as input to a model trained using training audio data to determine, by processing the audio data using the machine learning model, whether a glass breakage event has occurred during the period of interest. Components of the computing device 110 may be interconnected via an address/data bus or other means. The components included in the computing device 110 may include a processing unit 120, a network interface 122, a display 124, a user input device 126, and a memory 128, discussed in further detail below.

The processing unit 120 includes one or more processors, each of which may be a programmable microprocessor that executes software instructions stored in the memory 128 to execute some or all of the functions of the computing device 110 as described herein. Alternatively, one or more of the processors in the processing unit 120 may be other types of processors (e.g., application-specific integrated circuits (ASICs), field-programmable gate arrays (FPGAs), etc.).

The network interface 122 may include any suitable hardware (e.g., front-end transmitter and receiver hardware), firmware, or software configured to use one or more communication protocols to communicate with external devices or systems (e.g., the audio sensors 162, the biomanufacturing process machinery 160, the training audio data sources 150, etc.) via the network 170. For example, the network interface 122 may be or include an Ethernet interface.

The display 124 may use any suitable display technology (e.g., LED, OLED, LCD, etc.) to present information to a user, and the user input device 126 may be a keyboard or other suitable input device. In some aspects, the display 124 and the user input device 126 are integrated within a single device (e.g., a touchscreen display). Generally, the display 124 and the user input device 126 may combine to enable a user to interact with graphical user interfaces (GUIs) or other (e.g., text) user interfaces provided by the computing device 110 (e.g., for purposes such as notifying users of glass breakage, etc.).

The memory 128 includes one or more physical memory devices or units containing volatile or non-volatile memory, and may or may not include memories located in different computing devices of the computing device 110. Any suitable memory type or types may be used, such as read-only memory (ROM), solid-state drives (SSDs), hard disk drives (HDDs), etc. The memory 128 may store instructions for one or more software applications included in a glass breakage (GB) application 130 that can be executed by the processing unit 120. In the example system 100A, the GB application 130 includes a data collection unit 132, a model training unit 134, a user interface unit 136, a glass breakage detection unit 138, and a notification unit 140. The units 132-140 may be distinct software components or modules of the GB application 130, or may simply represent functionality of the GB application 130 that is not necessarily divided among different components/modules. For example, in some embodiments, the data collection unit 132 and the user interface unit 136 are included in a single software module. Moreover, in some embodiments, the units 132-140 may be distributed among multiple copies of the GB application 130 (e.g., executing at different components in the computing device 110), or among different types of applications stored and executed at one or more devices of the computing device 110.

The data collection unit 132 is generally configured to receive data (e.g., audio data, operator instructions, etc.). In some embodiments, the data collection unit 132 receives the training audio data (e.g., including historical audio data of a plurality of instances of the biomanufacturing process and corresponding historical audio data) of a biomanufacturing process for producing a biological product. The data collection unit 132 may receive the training audio data via, for example, the training audio data sources 150, user input received via the user interface unit 136 with the user input device 126, or other suitable means. In some embodiments, the data collection unit 132 may receive audio data via, for example, the audio sensors 162, user input received via the user interface unit 136 with the user input device 126, or other suitable means. In some embodiments, the computing device 110 may receive at, for example, the data collection unit 132 an indication that a biomanufacturing process has begun and one or more components of the computing device 110 may begin monitoring audio data provided, e.g., by the audio sensors 162. In some aspects, the data collection unit 132 may apply pre-processing to received audio data, for example, gain of amplification applied to one or both of training audio signals or audio signals, wherein the training audio signals and the audio signals respectively correspond to the training audio data and the audio data.

The model training unit 134 is generally configured to generate, train, or apply a model. The model may be any suitable model for detecting glass breakage events in audio data. In some embodiments, and as discussed further below, the model may be trained using at least some of the system 100A, or, in some embodiments, the model may be pre-trained (i.e., trained prior to being obtained by the computing device 110). The model may be trained using training audio data that represent (i) training ambient sounds, (ii) training glass sounds, and (iii) training glass breakage sounds. In some embodiments, the model may include a statistical model that may be parametric, nonparametric, or semiparametric. One suitable example of a statistical model which may be included in the model is a linear regression model. In other embodiments, the model includes a machine learning model. For example, the model may employ a neural network, such as a convolutional neural network or a deep learning neural network. Other examples of machine-learning models in the model are models that use support vector machine (SVM) analysis, K-Nearest neighbor analysis, naïve Bayes analysis, clustering, reinforcement learning, or other machine-learning algorithms or techniques. Machine learning models included in the model may identify and recognize patterns in training data in order to facilitate making predictions for new data. The model training unit 134 may train the model using the training audio data that may be received from the training audio data sources 150.

The user interface unit 136 is generally configured to receive user input. In one example, the user interface unit 136 may generate a user interface for presentation via the display 124, and receive, via the user interface and user input device 126, user-input training audio data to be used by the model training unit 134 when training the model. In another example, the user interface unit 136 may receive, via a user interface and user input device 126, inputs to start operation of the biomanufacturing process machinery 160 or the audio sensors 162. The user interface unit 136 may also be used to display information. For example, the user interface unit 136 may be used to display an indication of whether glass breakage events have been detected.

The glass breakage detection unit 138 may also apply or access the model trained by the model training unit 134 (or otherwise obtained by the computing device 110 as a pre-trained model) when determining whether a glass breakage event has occurred. In some embodiments, the glass breakage detection unit 138 begins monitoring for a glass breakage event in response to the data collection unit 132 receiving audio data. The glass breakage detection unit 138 may monitor audio data as it is collected by the data collection unit 132 in real-time, in near-real-time (i.e., with some buffer), or asynchronously (i.e., after the audio data is fully collected over a period of interest). It should be understood that when the glass breakage detection unit 138 is referred to as detecting whether a glass breakage event has occurred, this also includes detecting whether a glass breaking event is occurring (as the glass breakage detection unit 138 may monitor in real-time).

The notification unit 140 is generally configured to notify a user either (i) whether a glass breakage event has occurred, or (ii) that a glass breakage event has occurred. The notification unit 140 may coordinate with the user interface unit 136 to display a notification. The notification unit 140 may send an electronic message (e.g., e-mail, text, etc.) with a notification to a user of the computing device 110 or an external computing device. In some aspects, the notification unit 140 may send control signals to stop operation of the biomanufacturing process machinery 160 if a glass breakage event is detected by the glass breakage detection unit 138. In some aspects, the indication may be stored (e.g., in the memory 128), possibly along with other data (such as operation data) related to the biomanufacturing process machinery 160 that may be useful in diagnosing the cause of the glass breakage event.

In some aspects, some or all of the functionalities of the GB application 130 may be provided by a third-party (i.e., not on the computing device 110). For example, the machine learning may be hosted by a third-party and the GB application 130 may access the machine learning model remotely by sending data (e.g., the audio data) and receiving data (e.g., an indication of whether a glass breakage event has been detected). In such example, the functionality of the glass breakage detection unit 138 may be hosted by the third-party. Turning to a different example, the machine learning model may be trained by a third-party and the GB application 130 may receive the machine learning model remotely from the third-party (e.g., by the computing device 110 receiving one or more elements of the machine learning model, such as weights or architecture). In such example, the functionality of the model training unit 134 may be hosted by the third-party. In other examples, one or more instances of functionality of any of the units 132-140 may be hosted by a third-party, on, for example, a remote server accessible via the network 170.

Figure 1B:
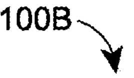
Figure 1B:
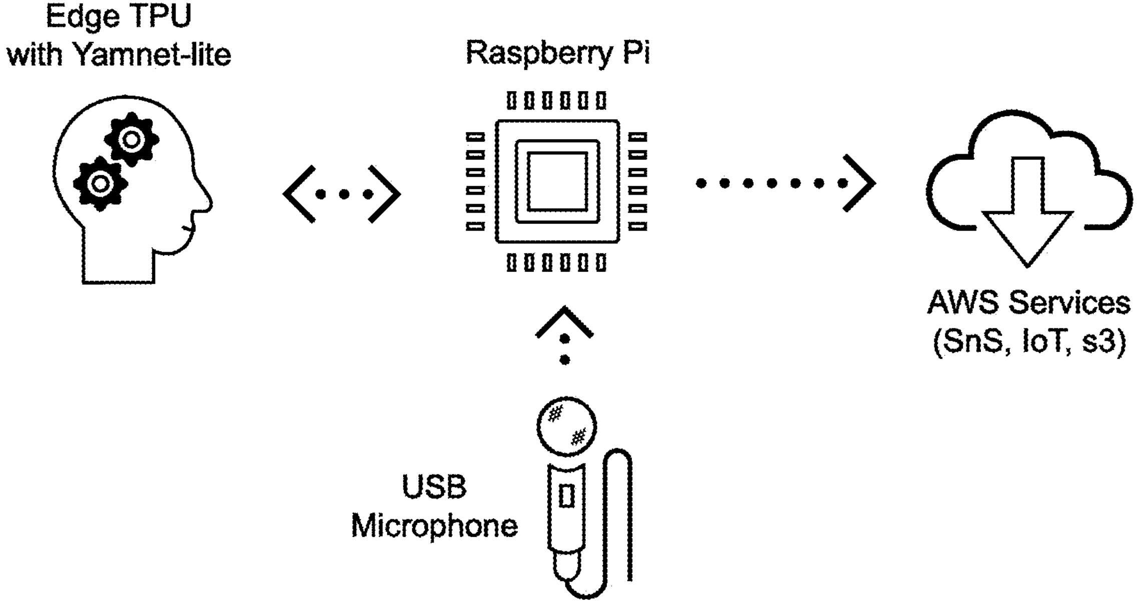

FIG. 1B depicts an exemplary system 100B that represents one embodiment wherein the computing device 110 of FIG. 1A may be an Internet of Things (IoT) device and may be communicatively coupled with one or more other devices (e.g., the audio sensors 162). For example, the computing device 110 may be the same as or similar to an architecture illustrated in FIG. 1B in which the computing device 110 is a Raspberry Pi that includes an interface for a USB microphone (which may be one or more of the audio sensors 162), an optional coral USB TPU accelerator, and a host of Amazon Web Services (AWS) services, including SnS, IoT Core, or S3 buckets. The Raspberry Pi may be chosen for the computing device 110 for its technical specifications enabling recording and storing of live audio data while providing remote access and a simple user interface. As will be appreciated, the Raspberry Pi also presents certain cost advantages and is well-supported with crowd-sourced software and technical support. Additionally, the Raspberry Pi can be easily customized and retro-fit with additional functionality. As further illustrated, the Coral USB TPU accelerator may be available to host and process deep learning models, enabling real-time audio data processing.

Exemplary Glass Breakage Event

Figure 2:
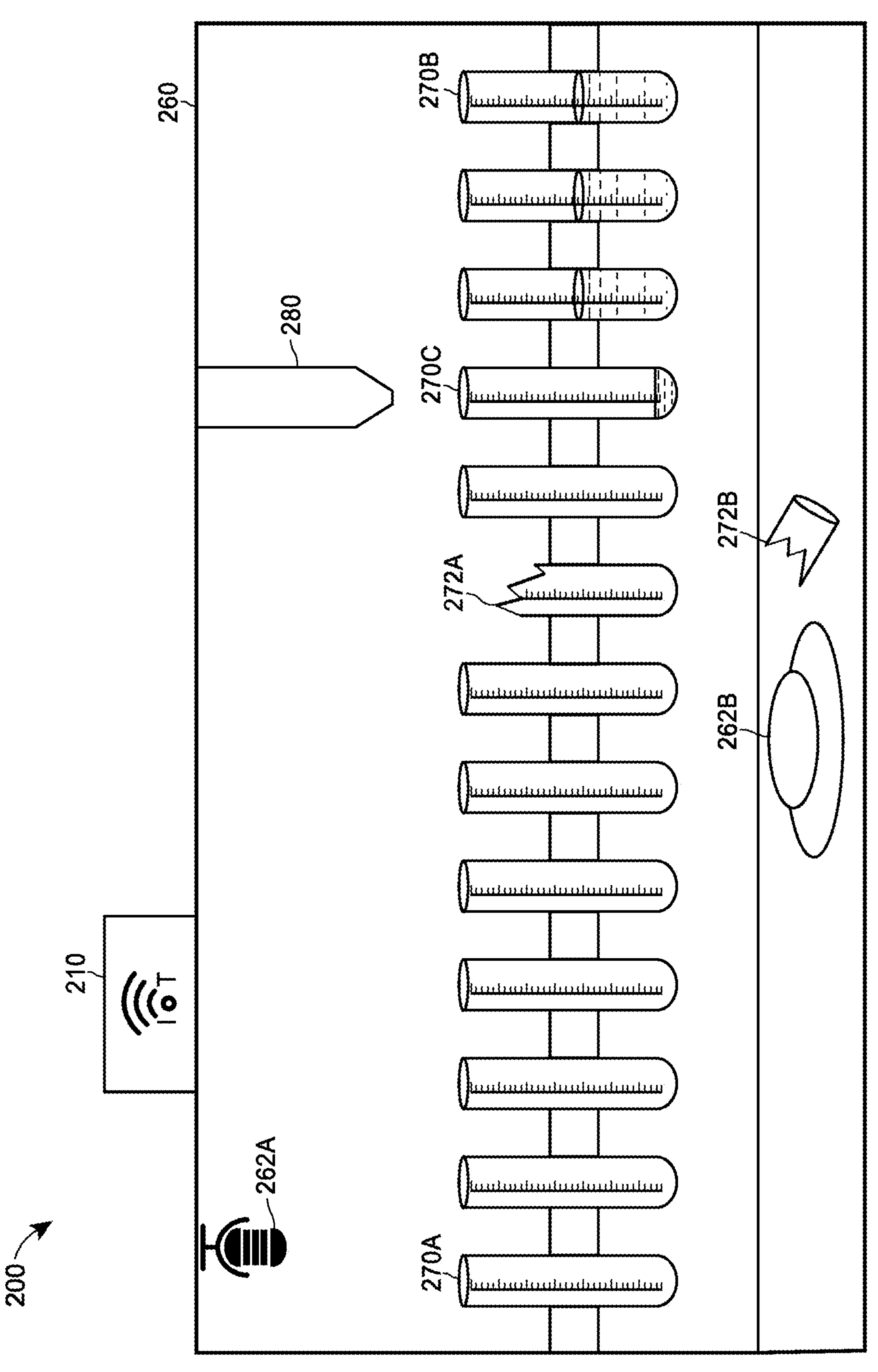
FIG. 2 depicts an example of scenario in which a glass breakage event has occurred in biomanufacturing process machinery.

FIG. 2 depicts an example scenario 200 in which a glass breakage event has occurred. As illustrated, the scenario 200 occurs in biomanufacturing process machinery 260 (that may be the same as or similar to the biomanufacturing process machinery 160 of FIG. 1A). As illustrated, the event of the scenario 200 occurs in proximity to audio sensors 262A and 262B (that may be the same as or similar to the audio sensors 162 of FIG. 1A) that are communicatively coupled with an IoT device 210 (that may be the same as or similar to the computing device 110 of FIG. 1A or as illustrated in the system 100B).

The biomanufacturing process machinery 260 is depicted as implementing filling containers (glass vials, as illustrated) with drug product (a liquid drug product, as illustrated). More specifically, some containers (including container 270A) are illustrated as unfilled with the drug product, some containers (including container 270B) are illustrated as filled with the drug product, and a container 270C is illustrated as partially-filled with the drug product. Furthermore, an unfilled, broken container 272A is illustrated along with corresponding debris 272B. As illustrated, the broken container 272A or the debris 272B can present safety hazards, to, for example, operators of the biomanufacturing process machinery 260 and/or end users/consumers of the drug product.

The two audio sensors 262A and 262B are illustrated as included in proximity to the event of the scenario 200. The standard microphone 262A may be further from a dispenser 280 than the surface microphone 262B. The standard microphone 262A may be an omni-directional microphone. The surface microphone 262B may be a "contact" microphone, which senses mechanical audio vibrations via direct contact with an object. The surface microphone 262B may be seated on a disk (e.g., a metallic disk).

Audio data corresponding to the event of the scenario 200 in which the container 272B broke may be captured by the two audio sensors 262A and 262B. In addition, the two audio sensors 262A and 262B may capture ambient audio data corresponding to operation sounds of the biomanufacturing process machinery 260. In addition, the two audio sensors 262A and 262B may capture sounds of glass contacting glass or glass contacting other surfaces (e.g., metal, wood, plastic, etc.).

The two audio sensors 262A and 262B may be communicatively coupled (e.g., via a wired connection, or a WLAN, etc.) to the IoT device 210. As illustrated, the IoT device 210 may be external to the biomanufacturing process machinery 260, while in some embodiments, the IoT device 210 may be integrated into the biomanufacturing process machinery 260. The IoT device 210 may detect the glass breakage event of the scenario 200 involving the container 272A and the debris 272B and, in response, may instruct the biomanufacturing process machinery to cease operation. As illustrated, the dispenser 280 that dispenses the drug product may stop dispensing the drug product in response to detection (e.g., via the GB application 130) of the glass breakage event of the scenario 200. By quickly stopping the dispensing of the drug product from the dispenser 280 and the operation of the biomanufacturing process machinery 260 as a whole, negative impacts (e.g., as described in the Background Section) caused by the event of the scenario 200 may be mitigated.

Exemplary Audio Data Processing

Figure 3:
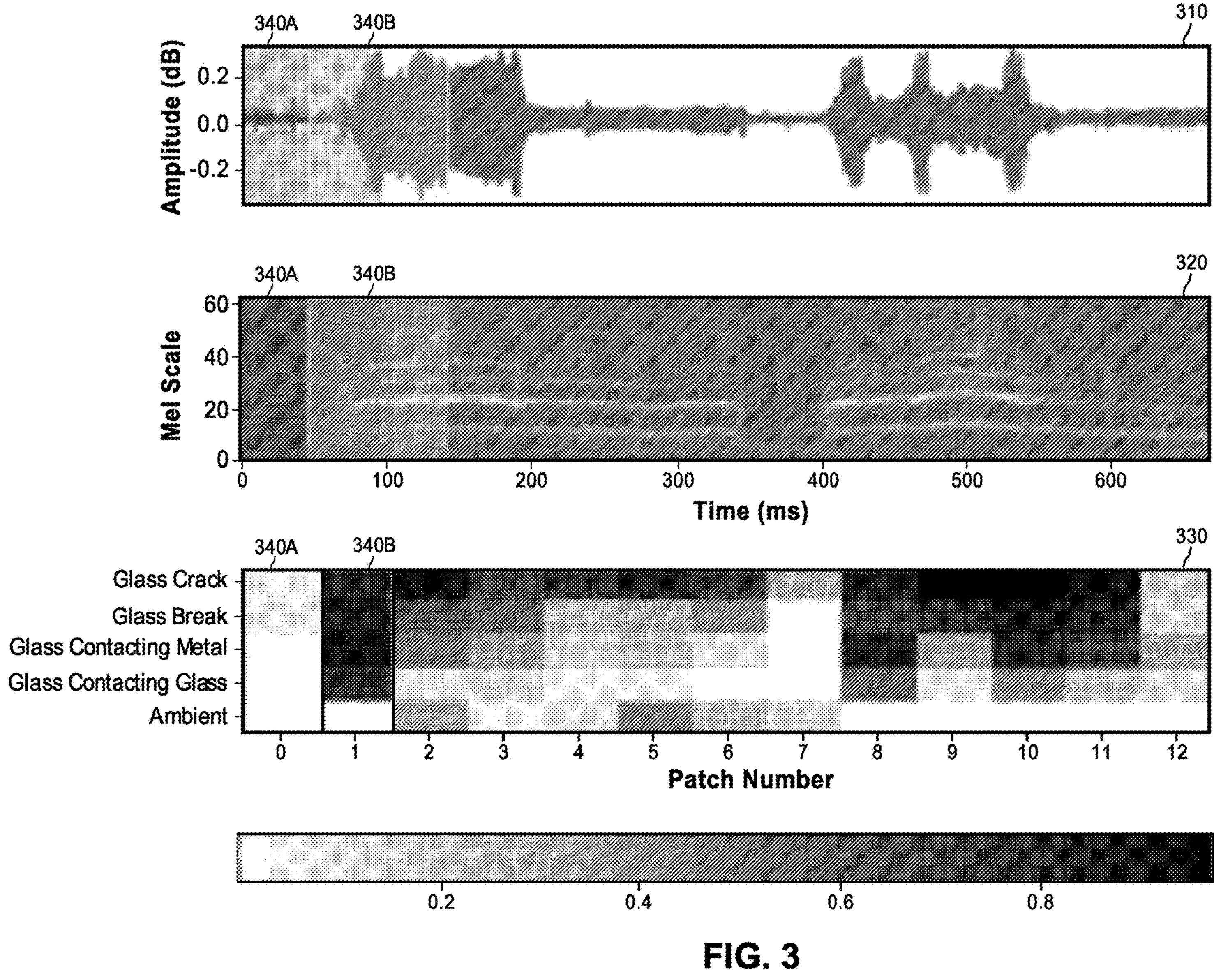
FIG. 3 depicts an example process of pre-processing audio data prior to inputting the audio data into a machine learning model.

FIG. 3 depicts an example data representations 300 of processing raw audio data 310 into a mel spectrogram 320 and into patches 330. The data representations 300 may correspond to equipment/apparatuses that are the same as or similar to those discussed above in connection with the system 100A/B. For example, the computing device 110 may implement/generate (e.g., the GB application 130, using audio data collected from the biomanufacturing process machinery 160 by the audio sensors 162) some or all of the data representations 300. Further, the data representations 300 may correspond to a detection process of glass breakage events that may be similar to the glass breakage event of the scenario 200 of FIG. 2.

The raw audio data 310 is collected via audio sensors (e.g., the audio sensors 162 or the two audio sensors 262A and 262B) that may be one or more of standard microphones, surface microphones, or other suitable microphones for collecting audio data. As illustrated, the raw audio data 310 may be sampled to 16 kHz mono as an input, while in other aspects, other suitable samplings may be viable.

The raw audio data 310 may be processed (e.g., by the computing device 110 using the data collection unit 132) to compute a spectrogram, as illustrated. In some aspects, a Fourier Transform (e.g., Short-Time Fourier Transform) is performed to compute the mel spectrogram 320 from the raw data 310. The spectrogram is converted into a stabilized log mel spectrogram (i.e., the mel spectrogram 320) by mapping it to 64 mel bins covering the range of 125-7500 Hz, and then taking the logarithm of the mel-spectrum 320 (with a small buffer added to avoid taking a logarithm of zero).

The mel spectrogram 320 may be processed (e.g., by the computing device 110 using the data collection unit 132) into patches 330. The patches 330 span 0.96 seconds with a 50% overlap, as illustrated. The patches 330 may correspond to a plurality of scores that may be generated by a model (e.g., using the GB application 130) with each score corresponding to a possible classification for a single patch of the patches 330. There may be a variety of classification possibilities for the patches 330, for example, "Glass Crack," "Glass Break," "Glass Contacting Metal," "Glass Contacting Plastic," "Ambient," etc. It is worth noting that the scores are not necessarily calibrated, and may be ultimately unit-less. For example, a score of 0.5 for a particular classifier is not necessarily a 50% probability of the respective classifier being detected by the model, and all of the output scores across each class do not necessarily sum to 1.

Superimposed over the data representations 300 is time window 340A and time window 340B. The time window 340A denotes the first 0.96 second patch of audio, which is temporally consistent in both the raw waveform and in the mel spectrogram. It should be noted that the scores included in the patches 330 for the time window 340B significantly differ from that of the time window 340A, despite the 50% overlap between the time window 340A and the time window 340B.

Exemplary Machine Learning Model

Figures 4A, 4B:
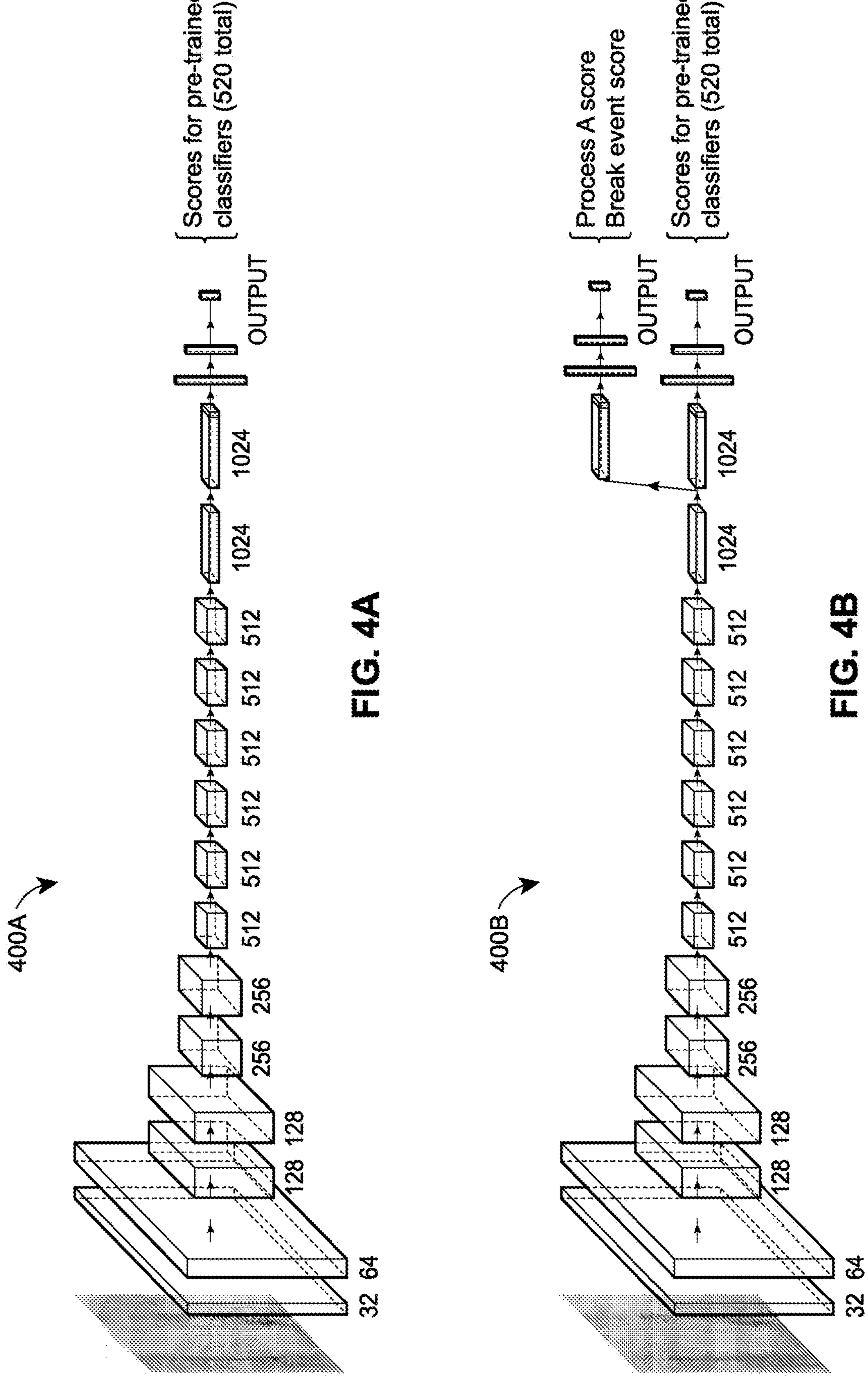
FIGS. 4A and 4B depict examples of machine learning models for identifying glass breakage events in biomanufacturing processes.

FIGS. 4A and 4B depict exemplary models 400A and 400B that may be generated, trained, and/or used (e.g., run or accessed) by the computing device 110 of FIG. 1A to predict that a glass breakage event has occurred. The models 400A and 400B may be used to predict glass breakage events such as the glass breakage event of the scenario 200 illustrated in FIG. 2 using audio data that may be processed in a manner similar to the one described with respect to the data representations 300 of FIG. 3. The models 400A and 400B may determine, by processing audio data, whether a glass breakage event has occurred during a period of interest. As previously-described, the models 400A and 400B may be statistical or machine learning models, although as illustrated, the models 400A and 400B correspond to machine learning models.

In embodiments where the models 400A and 400B are machine learning models, the models 400A and 400B may be universal (i.e., applicable to all circumstances), or may be more specific (i.e., different models for different circumstances). The machine learning models may be trained using a supervised or unsupervised machine-learning program or algorithm. The machine-learning program or algorithm may employ a neural network, which may be a convolutional neural network (CNN), a deep learning neural network, or a combined learning module or program that learns in two or more features or feature datasets in a particular areas of interest. In one embodiment, a generative adversarial neural network may be used. The machine-learning programs or algorithms may also include regression analysis, support vector machine (SVM) analysis, decision tree analysis, random forest analysis, K-Nearest neighbor analysis, naïve Bayes analysis, clustering, reinforcement learning, or other machine-learning algorithms or techniques. In some embodiments, due to the processing power requirements of training machine learning models, the selected model may be trained using additional computing resources (e.g., cloud computing resources) based upon data provided by external sources (e.g., the training audio data sources 150). The training data may be unlabeled, or the training data may be labeled, such as by a human. Training of the machine learning model may continue until at least one model of the machine learning model is validated and satisfies selection criteria to be used as a predictive model for determining whether a glass breakage event has occurred. In one embodiment, the machine learning model may be validated using a second subset of the training data to determine algorithm accuracy and robustness. Such validation may include applying the machine learning model to the training data of the second subset of training data to predict whether a glass breakage event has occurred in the second subset of the training data. The machine learning model may then be evaluated to determine whether the machine learning model performance is sufficient based upon the validation stage predictions. The sufficiency criteria applied may vary depending upon the size of the training data available for training, the performance of previous iterations of machine learning models, or user-specified performance requirements.

To be most effective, the models 400A and 400B should be computationally inexpensive to allow for real or near-real-time detection of glass breakage events (e.g., be capable of processing and classifying live audio data at the edge—meaning, by the device itself—or capable of sending audio data to the cloud for processing in real-time). Within the computational constraint driven by the device specifications, it is generally preferred that the models 400A and 400B maximize predictive power. Because glass break events are exceedingly rare and the impact of detection is substantial (e.g., biomanufacturing process stoppage), the models 400A and 400B preferably have exceptionally strong predictive power to avoid false positive events (classifying nominal environment noise as glass break events). In some aspects, the models 400A and 400B should achieve a false positive rate that approaches 0% while still maintaining a reasonable true positive rate (the rate at which the model correctly classifies real glass break events). These basic design criteria motivate make the open-sourced CNN dubbed "YAMNet" a suitable choice for feasibility testing.

In some aspects, CNNs are well-suited for machine vision applications due to their pattern recognition capabilities. As will be appreciated, CNNs differ from standard multi-layer perceptrons (MLPs) by using convolutional layers wherein matrices of numbers commonly referred to as filters are convolved with an input image to generate a tensor representing a new image with an arbitrary number of channels. This new tensor can be subsequently convolved with a new set of filters in another convolutional layer, producing yet another tensor. The process repeats for each layer defined in the CNN. In a typical classification task, the final output of a CNN is a vector set representing the predicted likelihood of each class. The filters of the CNN can be trained and selected based on recognizing distinct patterns such as edges, corners, or shapes.

YAMNet is a CNN that utilizes the MoblieNet depth wise separable convolution architecture that is an efficient convolutional network architecture that employs two hyper-parameters to build low latency models designed for mobile and embedded vision applications. More specifically, two alternative filters take the place of the standard convolutional filters: a depth wise convolution, which applies a single filter to each input, and a 1×1 pointwise convolution. YAMNet is an audio classification model incorporating the MobileNet (Depthwise separable CNN) architecture that has been pre-trained on the audio data to predict different audio events. In some embodiments, YAMNet may not require any feature extraction before passing the audio data into the model as the model has a feature extraction layer built into the model. The feature extraction layer may convert the audio data into spectrograms which are then passed into the MobileNet. As previously-discussed, to use the audio signals to train YAMNet, the audio data may need to be pre-processed. One way to pre-process the audio data is by applying an STFT to the audio data and converting the output from the STFT into spectrograms or mel spectrograms that use a logarithmic scale (e.g., as shown in the data representations 300).

In accordance with some of the basic design criteria, splitting up the filtering and combination steps of a typical convolution operation allows for a substantial reduction in computation cost: MobileNet produces nearly identical results to popular neural nets AlexNet, VGG16, and GoogleNet while being a fraction of the size and computationally intensive. Thus, the YAMNet model architecture, as will be appreciated by one of ordinary skill, having employed MobileNet, may have specific technical advantages in IoT applications (e.g., with the IoT device 210 of FIG. 2) where computational efficiency is often limited by the footprint of the device. More specifically, YAMNet is pre-trained on AudioSet, an ontology of 521 audio event classes and a collection of over 2 million human-labeled 10-second audio clips from YouTube videos. The event classes span a wide range of noises from musical instruments to natural sounds to various animals. The categories "Glass", "Clink", "Shatter", and "Crack" are of particular interest to detecting glass breakage events.

The YAMNet has two variations: the standard YAMNet model, and a TensorFlow Lite model dubbed YAMNet-lite, which is further tailored to mobile applications. The YAMNet model takes raw audio data that is processed in accordance with the data representations 300 of FIG. 3 (sampled to 16 kHz mono as an input, taking an STFT to compute a spectrogram, converting the spectrogram into a stabilized log mel spectrogram by mapping it to 64 mel bins covering the range of 125-7500 Hz, and then taking the logarithm of the mel-spectrum (with a small buffer added to avoid taking a logarithm of zero)). Time windows of 0.96 seconds with a 50% overlap (as also shown in the data representations 300 of FIG. 3) are fed into the MobileNet, returning 521 scores ranging from 0 to 1 for each class in the AudioSet ontology. Importantly, the output scores are not calibrated, and ultimately unit-less. For example, a score of 0.5 for a particular classifier is not interpretable as a 50% probability of the respective classifier being detected by the model, nor do all of the output scores across each class sum to 1.

The YAMNet-lite model behaves similarly to the standard YAMNet model, with two major differences: the model is quantized—thus, re-trained with Relu6 nonlinearities instead of Relu activation—and the input must be a fixed 0.975 second frame of 16 kHz mono audio. Logically, the output of the YAMNet-lite model is a single vector of the 521 classification scores. As will be appreciated by one having ordinary skill, the YAMNet-lite model may have further technical advantages for use in optimizing computational expense with an IoT device, such as the IoT device 210 of FIG. 2.

With reference to FIG. 1B, the Raspberry Pi of FIG. 1B may host a collection of software modules (e.g., Python code) that interface with peripheral devices such as a module for continuously recording time windows (e.g., 0.975s) of raw, 16-bit PCM audio, which is processed by the YAMNet model make calls to various AWS clients to send a text message to subscribers, save audio recordings to an s3 bucket in the AWS Cloud, and deliver an MQTT message to AWS IoT Core. One or more modules of the Raspberry Pi may also interface with the audio stream to save the audio locally to the Raspberry Pi as a backup. One or more modules of the Raspberry Pi may also interface with the USB microphone to initialize the continuous audio streaming and recording functionality. One or more modules of the Raspberry Pi may also initialize the YAMNet-lite model as well as the model's hyper-parameters, wherein the model can be hosted locally on the Raspberry Pi, or on the Coral USB Accelerator for increased processing capability. One or more modules of the Raspberry Pi may also initialize connections to the various AWS clients. The various modules of the Raspberry Pi may also work in tandem to continuously record and classify time windows (e.g., 0.975 s) of live audio using the YAMNet model architecture. Communication protocols via AWS have been established to enable the device to store audio in the cloud. Additionally, should a conditional heuristic be established (e.g., if the output of the YAMNet model is >0.2 for the "Glass" classifier), the device can be configured to automatically send an alert to all interested parties that a potential glass break event has occurred.

The models 400A and 400B provide a visual representation of YAMNet's architecture that is optimized for mobile audio detection applications. Given the predictive power of the YAMNet's pre-trained audio classifiers on nominal audio data, the models 400A and 400B may be trained via transfer learning (i.e., the improvement of learning in a new task through the transfer of knowledge from a related task that has already been learned). In context of the models 400A and 400B, transfer learning may be employed by the YAMNet model's architecture with the inclusion of additional custom trained classifiers. The model 400A is a visual representation of the YAMNet-lite model architecture, which receives two new classifiers as depicted in the model 400B. The models 400A and 4000B return a 2×1 vector of classifications scores. The "Process A" classifier of the model 400B is trained on the Process A audio data, while the "Break Event" classifier of the model 400B is trained on the glass break event sounds. Process A refers to audio data from an integrated downstream fill-finish process (an example of a biomanufacturing process), as a representative environment where glass containers are handled, and thus glass breakage may occur.

Exemplary Glass Breakage Event Detection Performance

Figure 5A:
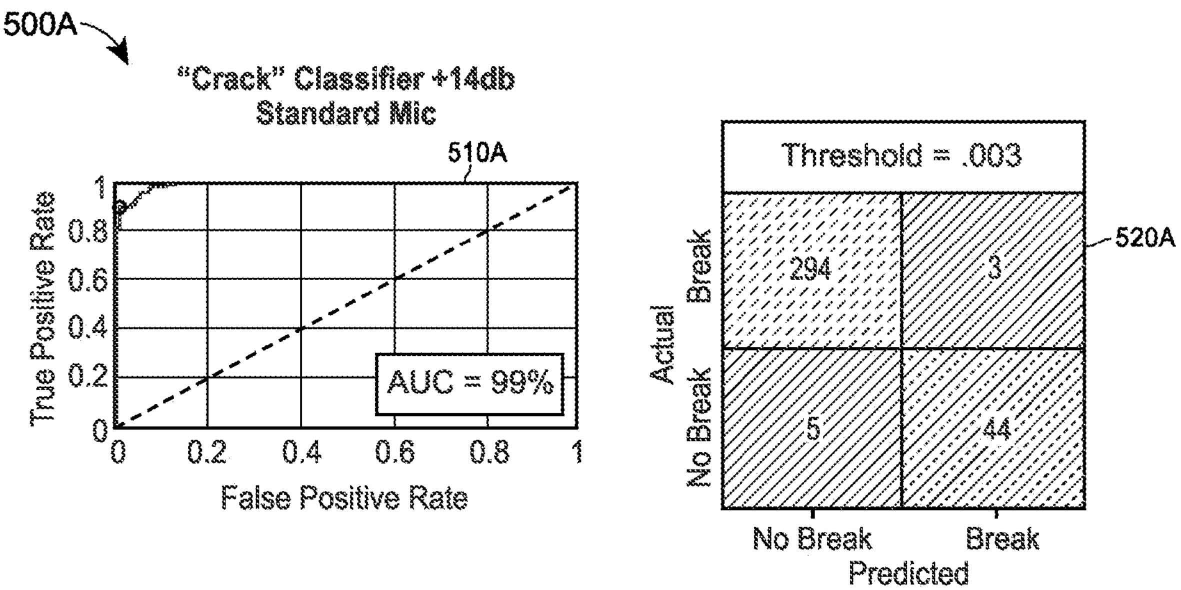
FIGS. 5A and 5B depict examples of experimental performance data of machine learning models used to identify glass breakage events in biomanufacturing processes.
Figure 5B:
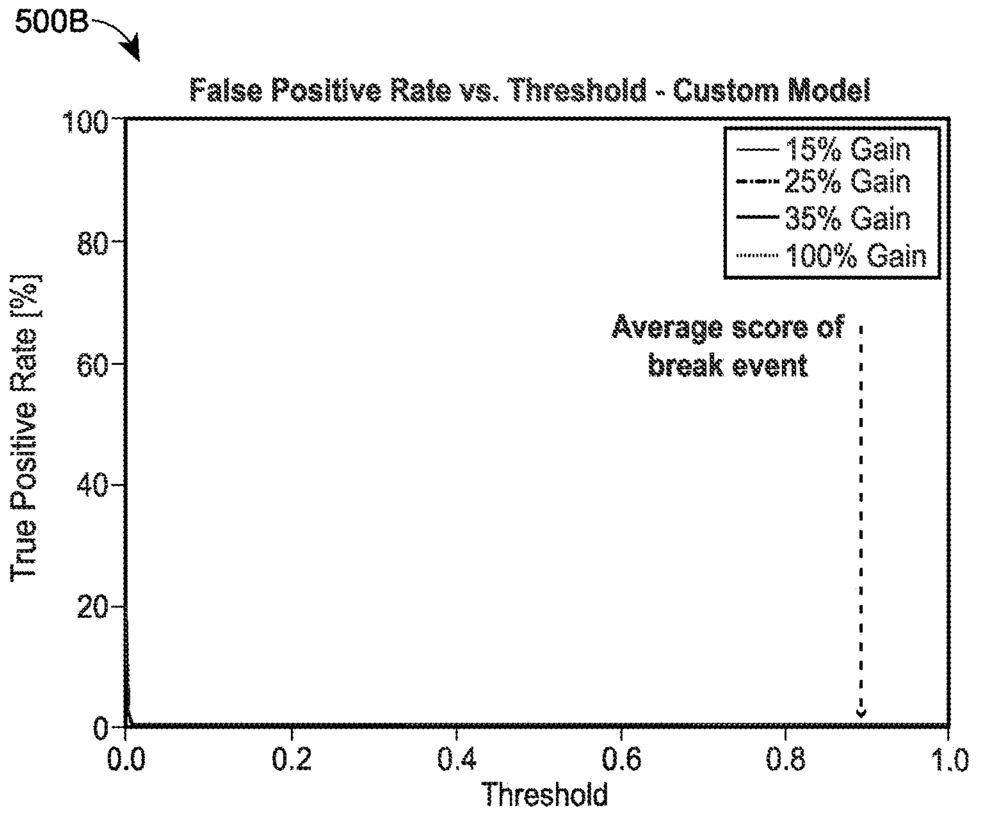

FIGS. 5A and 5B illustrate exemplary experimental data 500A and 500B representing performance of one embodiment of the presently disclosed techniques in determining, by processing audio data using a machine learning model, whether a glass breakage event has occurred during a period of interest. The machine learning model corresponding to the data 500A may be trained or used via the system 100A/B to detect glass breakage events (e.g., the glass breakage event of the scenario 200) using a model that may be the same as or similar to the models 400A or 400B processing the audio data that may be pre-processed according to the data representations 300.

In some aspects, the audio signals of the audio data used by the machine learning model corresponding to the data 500A or 500B may have gain added (e.g., by the IoT device 210 or the computing device 110). Adding gain to the audio signals can affect the performance of the machine learning model in predicting whether or not a glass breakage event occurred over the period of time included in the audio data. Adding gain may create separation between glass breakage sounds and other sounds, improving the machine learning model's ability to differentiate between the sounds. Determining a preferred amount of gain may be done using an iterative approach that is application-specific with sufficiency criteria for performance.

As shown in the data 500A, a gain level of +16 decibels was chosen (e.g., by an operator) for audio signals of the audio data input to the machine learning model. The data 500A corresponds to the performance of the machine learning model classifying a closed data set when trained on the AudioSet data previously-described (the training audio data). The receiver operating characteristic curve (ROC) 510A for the machine learning model as well as the binary confusion matrix 520A for a threshold score of 0.003 is included in the data 500A. As demonstrated in the data 500A, the machine learning model approaches a perfect classifier. At a score threshold of ≥0.003, the True Positive Rate is 90% and the False Positive Rate is 1%. This is a strong result for demonstrating the predictive performance of the machine learning model. The main limitation in the data 500A is the simulated environment of the audio data: though real biomanufacturing process glass containers are used for generating the audio data, the containers are empty (e.g., not filled with biopharmaceuticals). Additionally, the audio recordings were not taken from a production line, so the ambient sounds of the environment in which a glass breakage event may occur are not exactly simulated.

The data 500B resolves some of the limitations of the data 500A by predicting occurrence of glass breakage events on audio data that represents (i) ambient sounds (e.g., lab, equipment, machinery sounds, etc.), (ii) glass sounds (e.g., glass contacting another material that may be glass or non-glass), and (iii) training glass breakage sounds (e.g., cracking, breaking, shattering, etc.). The data 500B correspond to a custom trained machine learning model using the architecture of the model 400B with the two classifiers (i.e., the "Process A" classifier is trained on the Process A audio data and the "Break Event" classifier is trained on the glass break event noises). The data 500B demonstrates that the machine learning model performs near perfectly in classifying break events and Process A audio data with a False Positive Rate reaching 0% for score thresholds >0.02. Additionally, variation in microphone gain is negligible. As such, the data 500B demonstrate the success of present techniques in differentiating the sound of glass breaking from other sounds (i.e., ambient sounds and glass sounds).

Exemplary Flow Diagram

Figure 6:
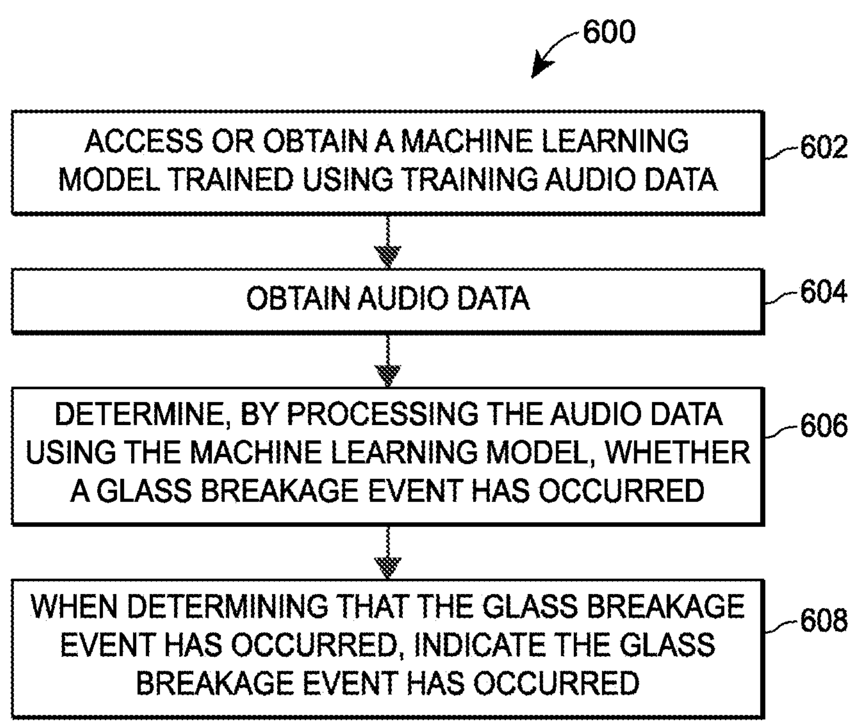
FIG. 6 is a flow diagram depicting an example method for identifying glass breakage events in biomanufacturing processes.

FIG. 6 is a flow diagram depicting an example method 600 for identifying glass breakage events (e.g., the glass breakage event of the scenario 200). The method 600 may be implemented by one or more components of the system 100A/B, such as the processing unit 120, when implementing the GB application 130 and possibly also the biomanufacturing process machinery 160 (which may be operating a biomanufacturing process). The method 600 may be performed as a part of a process that is the same as or similar to the data representations 300. The method 600 may receive audio data over a period of interest (e.g., from the biomanufacturing process machinery 160 and the audio sensors 162). The example method 600 may include the following elements: (1) accessing or obtaining a machine learning model trained using training audio data (block 602), (2) obtaining audio data (block 604), (3) determining, by processing the audio data using the machine learning model, whether a glass breakage event has occurred (block 606), and (4) when determined that the glass breakage event has occurred, indicating the glass breakage event has occurred.

The trained machine learning model obtained (e.g., downloading, generating, training, etc. the machine learning model) or accessed (e.g., accessing a third-party remote server hosting the machine learning model) at block 602 may have been trained using training audio data (e.g., as described above), such as the training audio data included in the training audio data sources 150. In some aspects, the training audio data may include one or more spectrograms that may be the same as or similar to the mel spectrogram 320. The training audio data may represent (i) training ambient sounds, (ii) training glass sounds, and (iii) training glass breakage sounds. More specifically, (i) the training ambient sounds may include sounds caused by operation of machinery, (ii) the training glass sounds may include sounds caused by a first glass surface contacting either a second glass surface or a non-glass surface, and (iii) the training glass breakage sounds may include sounds caused by either glass cracking or glass breaking. In some aspects, the machine learning model is a convolutional neural network or is trained using a supervised learning technique. The training audio data may include (i) ambient sound labels, (ii) glass sound labels, and (iii) breakage sound labels. In some aspects, the machinery implements a biomanufacturing process (e.g., via the biomanufacturing process machinery 160) and the training glass sounds and the training glass breakage sounds are produced by one or more containers of one or more drug products. In some embodiments, obtaining the machine learning model at block 602 includes receiving a pre-trained model (i.e., trained prior to being obtained by, for example, the system 100), or generating/training (e.g., by the system 100) the machine learning model. The machine learning model may be obtained internally (e.g., by accessing files/programs/data/information stored locally in a computing system, such as the computing device 110) or externally (e.g., by receiving the model from an outside source, such as receiving the machine learning model at the computing device 110 via the network 170).

Block 604 may include obtaining the audio data over a period of interest. The audio data may be input or provided by a user via a user interface (e.g., using the user input device 126) or by collecting the audio data as data (e.g., via the data collection unit 136). The audio data may be collected by audio sensors (e.g., the audio sensors 162) that may be inside, outside, or in proximity to biomanufacturing process machinery (e.g., the biomanufacturing process machinery 160). In some aspects, similar to the training audio data, the audio data may include one or more spectrograms that may be the same as or similar to the mel spectrogram 320 and obtaining the audio data over the period of interest includes generating the spectrogram of the audio data from raw audio data using a Fourier Transform (e.g., a SFTF). In some aspects, the audio data may be pre-processed such as (i) as described in the data representations 300, or (ii) by iteratively adjusting, by the one or more processors, gain of amplification applied to one or both of training audio signals or audio signals until a performance threshold is satisfied, wherein the training audio signals and the audio signals respectively correspond to the training audio data and the audio data.

Block 606 may include determining, by processing the audio data using the machine learning model, whether a glass breakage event has occurred (which may include a glass breakage event that has occurred or is occurring) during the period of interest. Determining that a glass breakage event has occurred may be a single binary value (e.g., 0 to indicate no glass breakage event has occurred, 1 to indicate a glass breakage event has occurred), or multiple values representing a probability that a glass breakage event has occurred (e.g., scores representing a range from 0% probability to 100% probability). In some aspects, the machine learning model may be a CNN such as YAMNet or YAMNet-lite (as described herein), a linear regressor, a random forest model, a model using support vector machine (SVM) analysis, K-Nearest neighbor analysis, naïve Bayes analysis, clustering, or reinforcement learning, or another suitable machine learning model. In some embodiments, a statistical model such as a linear regression model or some other suitable statistical model may be used in addition or in alternative to the machine learning model for identifying glass breakage events.

In some aspects, the method 600 may end with block 608 that may include indicating (e.g., via a computing device such as the computing device 110) that the glass breakage event has occurred. In some aspects the indication may be visual (e.g., displayed on the display 124), auditory (e.g., played on speakers), haptic, or some other suitable notification method. In some aspects notification may include electronic messaging, such as sending a text message or e-mail message to a user (e.g., an operator of the biomanufacturing process machinery). In some aspects, the indication may be stored, possibly along with other data (such as operation data) related to the biomanufacturing process that may be useful in diagnosing the cause of the glass breakage event. In some aspects, after identifying the glass breakage event, block 607 may include automatically causing the biomanufacturing process machinery to stop operation.

In some aspects, the method 600 may be performed either entirely by automation, e.g., by one or more processors (e.g., a CPU or GPU) that execute instructions stored on one or more non-transitory, computer-readable storage media (e.g., a volatile memory or a non-volatile memory, a read-only memory, a random-access memory, a flash memory, an electronic erasable program read-only memory, or one or more other types of memory. The method 600 may use any of the components, processes, or techniques of one or more of FIGS. 1-5.

Exemplary Flow Diagram

Figure 7:
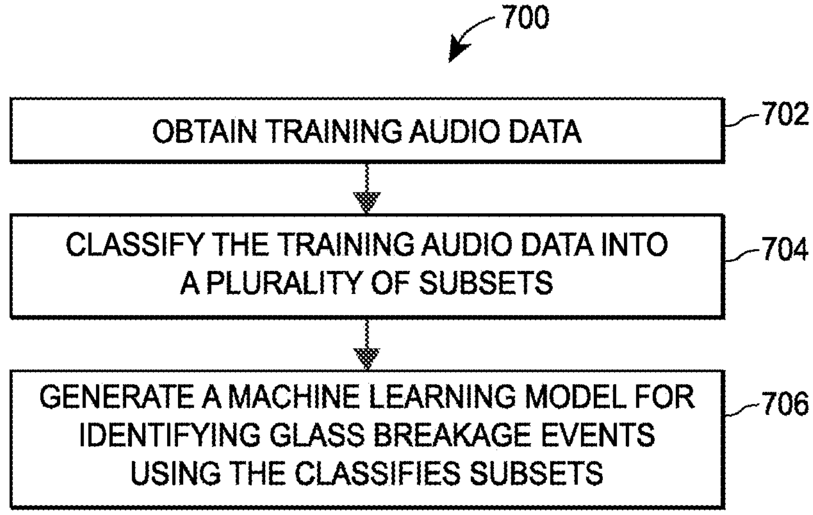
FIG. 7 is a flow diagram depicting an example method for training a machine learning model to identify glass breakage events in biomanufacturing processes.

FIG. 7 is a flow diagram depicting an example method 700 for training a machine learning model for identifying glass breakage events (e.g., the glass breakage event of the scenario 200). The method 700 may be implemented by one or more components of the system 100A/B, such as the processing unit 120 when implementing the GB application 130 and possibly also the biomanufacturing process machinery 160 (which may be operating a biomanufacturing process), or by a different device or system (e.g., the server of a third party that develops and hosts the machine learning model). The method 700 may be performed as a part of a process that is the same as or similar to the data representations 300. The method 700 may receive training audio data over a period of interest (e.g., from the training audio data sources 150). The example method 700 may include the following elements: (1) obtaining training audio data (block 702), (2) classifying the training audio data into a plurality of subsets (block 704), and (3) generating a machine learning model for identifying glass breakage events using the classified subsets (block 706).

Block 702 may include obtaining the training audio data (e.g., from the training audio data sources 150, at the computing device via the data collection unit 132, etc.). In some aspects, the training audio data may include one or more spectrograms that may be the same as or similar to the mel spectrogram 320. The training audio data may represent (i) training ambient sounds, (ii) training glass sounds, and (iii) training glass breakage sounds. More specifically, (i) the training ambient sounds may include sounds caused by operation of machinery, (ii) the training glass sounds may include sounds caused by a first glass surface contacting either a second glass surface or a non-glass surface, and (iii) the training glass breakage sounds may include sounds caused by either glass cracking or glass breaking. In some aspects, the training audio data include (i) ambient sound labels, (ii) glass sound labels, and (iii) breakage sound labels. In some aspects, the machinery implements a biomanufacturing process (e.g., via the biomanufacturing process machinery 160) and the training glass sounds and the training glass breakage sounds are produced by one or more containers of one or more drug products. In some aspects, the training audio data may be pre-processed (e.g., in the same or similar manner as the data representations 300) with iteratively adjusting gain of amplification applied to training audio signals until a performance threshold is satisfied, wherein the training audio signals correspond to the training audio data.

Block 704 may include classifying the training audio data into a plurality of subsets each corresponding to different actual outcome data (meaning a specific outcome or range of outcomes), the subsets including (i) at least one subset representing training ambient sounds, (ii) at least one subset representing training glass sounds, and (iii) at least one subset representing training glass breakage sounds. In some aspects, classification of the training audio data into the plurality of subsets may be done by a computing device (e.g., the computing device 110 using the GB application 130 and the model training unit 134), based on, for example, labels associated with the training audio data.

In some aspects, the method 700 may end at block 706 with generating the machine learning model for identifying glass breakage events using the classified subsets of the training audio data. In some aspects, the machine learning model may be a CNN such as YAMNet or YAMNet-lite (as described herein), a linear regressor, a random forest model, a model using support vector machine (SVM) analysis, K-Nearest neighbor analysis, naïve Bayes analysis, clustering, or reinforcement learning, or another suitable machine learning model. In some embodiments, a statistical model such as a linear regression model or some other suitable statistical model may be used in addition or in alternative to the machine learning model for identifying glass breakage events. The machine learning model may be stored using a computing device, such as the computing device 110 (e.g., specifically using the memory 128).

In some aspects, the method 700 may be performed either entirely by automation, e.g., by one or more processors (e.g., a CPU or GPU) that execute instructions stored on one or more non-transitory, computer-readable storage media (e.g., a volatile memory or a non-volatile memory, a read-only memory, a random-access memory, a flash memory, an electronic erasable program read-only memory, or one or more other types of memory). The method 600 may use any of the components, processes, or techniques of one or more of FIGS. 1-6.

Additional Considerations

Some of the figures described herein illustrate example block diagrams having one or more functional components. It will be understood that such block diagrams are for illustrative purposes and the devices described and shown may have additional, fewer, or alternate components than those illustrated. Additionally, in various aspects, the components (as well as the functionality provided by the respective components) may be associated with or otherwise integrated as part of any suitable components.

Some aspects of the disclosure relate to a non-transitory computer-readable storage medium having instructions/computer-readable storage medium thereon for performing various computer-implemented operations. The term "instructions/computer-readable storage medium" is used herein to include any medium that is capable of storing or encoding a sequence of instructions or computer codes for performing the operations, methodologies, and techniques described herein. The media and computer code may be those specially designed and constructed for the purposes of the aspects of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices ("PLDs"), and ROM and RAM devices.

Examples of computer code include machine code, such as produced by a compiler, and files containing higher-level code that are executed by a computer using an interpreter or a compiler. For example, an aspect of the disclosure may be implemented using Java, C++, or other object-oriented programming language and development tools. Additional examples of computer code include encrypted code and compressed code. Moreover, an aspect of the disclosure may be downloaded as a computer program product, which may be transferred from a remote computer (e.g., a server computer) to a requesting computer (e.g., a computer or a different server computer) via a transmission channel. Another aspect of the disclosure may be implemented in hardwired circuitry in place of, or in combination with, machine-executable software instructions.

As used herein, the singular terms "a," "an," and "the" may include plural referents, unless the context clearly dictates otherwise. This description, and the claims that follow, should be read to include one or at least one and the singular also includes the plural unless expressly stated or it is obvious that it is meant otherwise. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the terms "approximately," "substantially," "substantial," "roughly" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the techniques disclosed herein have been described with primary to particular operations performed in a particular order, it will be understood that these operations may be combined, sub-divided, or re-ordered to form an equivalent technique without departing from the teachings of the present disclosure. Accordingly, unless specifically indicated herein, the order and grouping of the operations are not limitations of the present disclosure.

What is claimed:

1. A computer-implemented method of using machine learning for identifying glass breakage events, comprising:

accessing or obtaining, by one or more processors, a machine learning model trained using training audio data that represent (i) training ambient sounds including sounds caused by operation of machinery, (ii) training glass sounds including sounds caused by a first glass surface contacting a second surface which is either a second glass surface or a non-glass surface, wherein the first glass surface does not break or crack as a result of contacting the second surface, and (iii) training glass breakage sounds including sounds caused by either glass cracking or glass breaking;

obtaining, by the one or more processors, audio data over a period of interest;

determining, by the one or more processors processing the audio data using the machine learning model, whether a glass breakage event has occurred during the period of interest; and when determined that the glass breakage event has occurred:

indicating, by the one or more processors, that the glass breakage event has occurred, and automatically controlling, by the one or more processors, operation of the machinery.

2. The computer-implemented method of claim 1, wherein:

the training audio data and the audio data each include one or more spectrograms; and obtaining the audio data over the period of interest includes generating the spectrogram of the audio data from raw audio data using a Fourier Transform.

3. The computer-implemented method of claim 1, wherein the machinery implements a biomanufacturing process and the training glass sounds and the training glass breakage sounds are produced by one or more containers of one or more drug products.

4. The computer-implemented method of claim 1, wherein automatically controlling operation of the machinery includes:

automatically causing, by the one or more processors, the machinery to stop operation.

5. The computer-implemented method of claim 1, further comprising:

iteratively adjusting, by the one or more processors, gain of amplification applied to one or both of training audio signals or audio signals until a performance threshold is satisfied, wherein the training audio signals and the audio signals respectively correspond to the training audio data and the audio data.

6. The computer-implemented method of claim 1, wherein (a) the machine learning model is a convolutional neural network, and/or (b) the machine learning model is trained using a supervised learning technique, and the training audio data include (i) ambient sound labels, (ii) glass sound labels, and (iii) breakage sound labels.

7. A computer system of using machine learning for identifying glass breakage events, comprising:

one or more processors;

a program memory coupled to the one or more processors and storing executable instructions that, when executed by the one or more processors, cause the computer system to:

access or obtain a machine learning model trained using training audio data that represent, (i) training ambient sounds including sounds caused by operation of machinery (ii) training glass sounds including sounds caused by a first glass surface contacting a second surface which is either a second glass surface or a non-glass surface, wherein the first glass surface does not break or crack as a result of contacting the second surface, and (iii) training glass breakage sounds including sounds caused by either glass cracking or glass breaking, obtain audio data over a period of interest, determine, by processing the audio data using the machine learning model, whether a glass breakage event has occurred during the period of interest, and when determined that the glass breakage event has occurred:

indicate that the glass breakage event has occurred, and automatically control operation of the machinery.

8. The computer system of claim 7, wherein:

the training audio data and the audio data each include one or more spectrograms; and obtaining the audio data over the period of interest includes generating the spectrogram of the audio data from raw audio data using a Fourier Transform.

9. The computer system of claim 7, wherein the machinery implements a biomanufacturing process and the training glass sounds and the training glass breakage sounds are produced by one or more containers of one or more drug products.

10. The computer system of claim 7, wherein to automatically control operation of the machinery, the instructions, when executed by the one or more processors, further cause the computer system to:

automatically cause the machinery to stop operation.

11. The computer system of claim 7, wherein the machine learning model is a convolutional neural network.

12. The computer system of claim 7, wherein:

the machine learning model is trained using a supervised learning technique, and the training audio data include, (i) ambient sound labels, (ii) glass sound labels, and (iii) breakage sound labels.

13. The computer system of claim 7, wherein, the instructions, when executed by the one or more processors, further cause the computer system to:

iteratively adjust gain of amplification applied to one or both of training audio signals or audio signals until a performance threshold is satisfied, wherein the training audio signals and the audio signals respectively correspond to the training audio data and the audio data.

14. A computer-implemented method for training a machine learning model for identifying glass breakage events, comprising:

obtaining, by one or more processors, training audio data;

classifying, by the one or more processors, the training audio data into a plurality of subsets each corresponding to different actual outcome data, the subsets including (i) at least one subset representing training ambient sounds including sounds caused by operation of machinery, (ii) at least one subset representing training glass sounds including sounds caused by a first glass surface contacting a second surface which is either a second glass surface or a non-glass surface, wherein the first glass surface does not break or crack as a result of contacting the second surface, and (iii) at least one subset representing training glass breakage sounds including sounds caused by either glass cracking or glass breaking; and generating, by the one or more processors, the machine learning model for identifying glass breakage events using the classified subsets of the training audio data.

15. The computer-implemented method of claim 14, wherein the training audio data include one or more spectrograms.

16. The computer-implemented method of claim 14, wherein the machinery implements a biomanufacturing process and the training glass sounds and the training glass breakage sounds are produced by one or more containers of one or more drug products.

17. The computer-implemented method of claim 14, further comprising:

iteratively adjusting, by the one or more processors, gain of amplification applied to training audio signals until a performance threshold is satisfied, wherein the training audio signals correspond to the training audio data.

18. The computer-implemented method of claim 14, wherein the machine learning model is a convolutional neural network.

* * * * *